July 22, 1969 G. G. HAVENS 3,457,170
SOLVENT SEPARATION PROCESS AND APPARATUS
Filed April 14, 1966 4 Sheets-Sheet 1
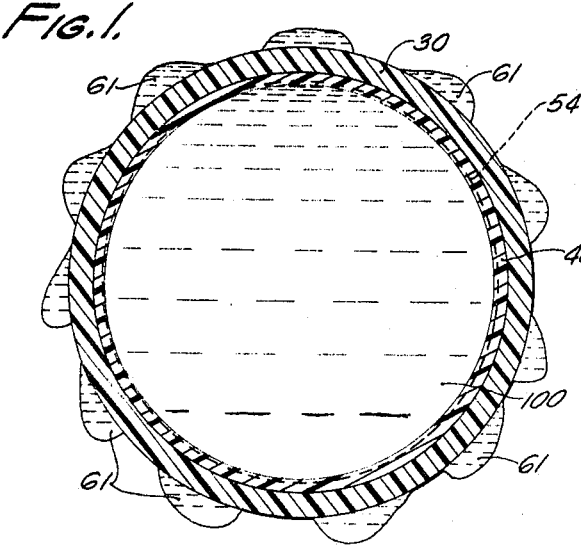
FIG. 1.
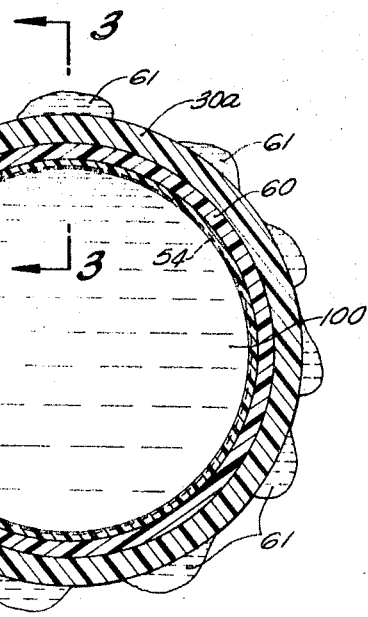
FIG. 3.
FIG. 2
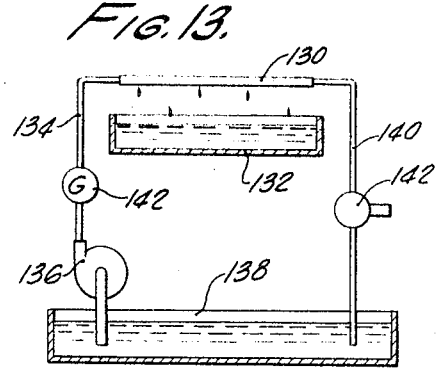
FIG. 13.
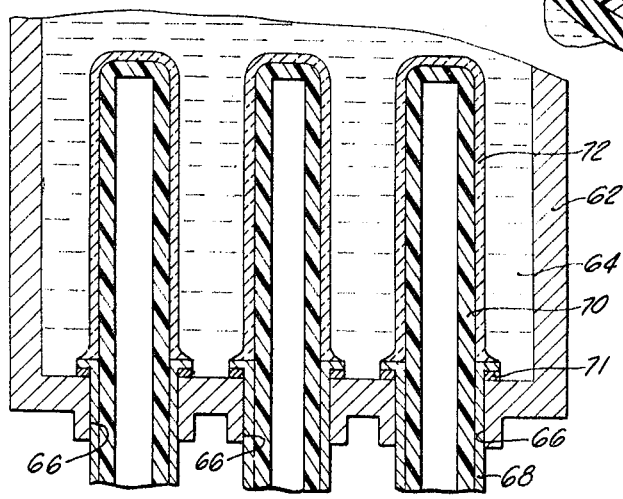
FIG. 12.
INVENTOR.
GLENN G. HAVENS
BY Lyon+Lyon
ATTORNEYS INVENTOR.
GLENN G. HAVENS
BY Lyon & Lyon
ATTORNEYS

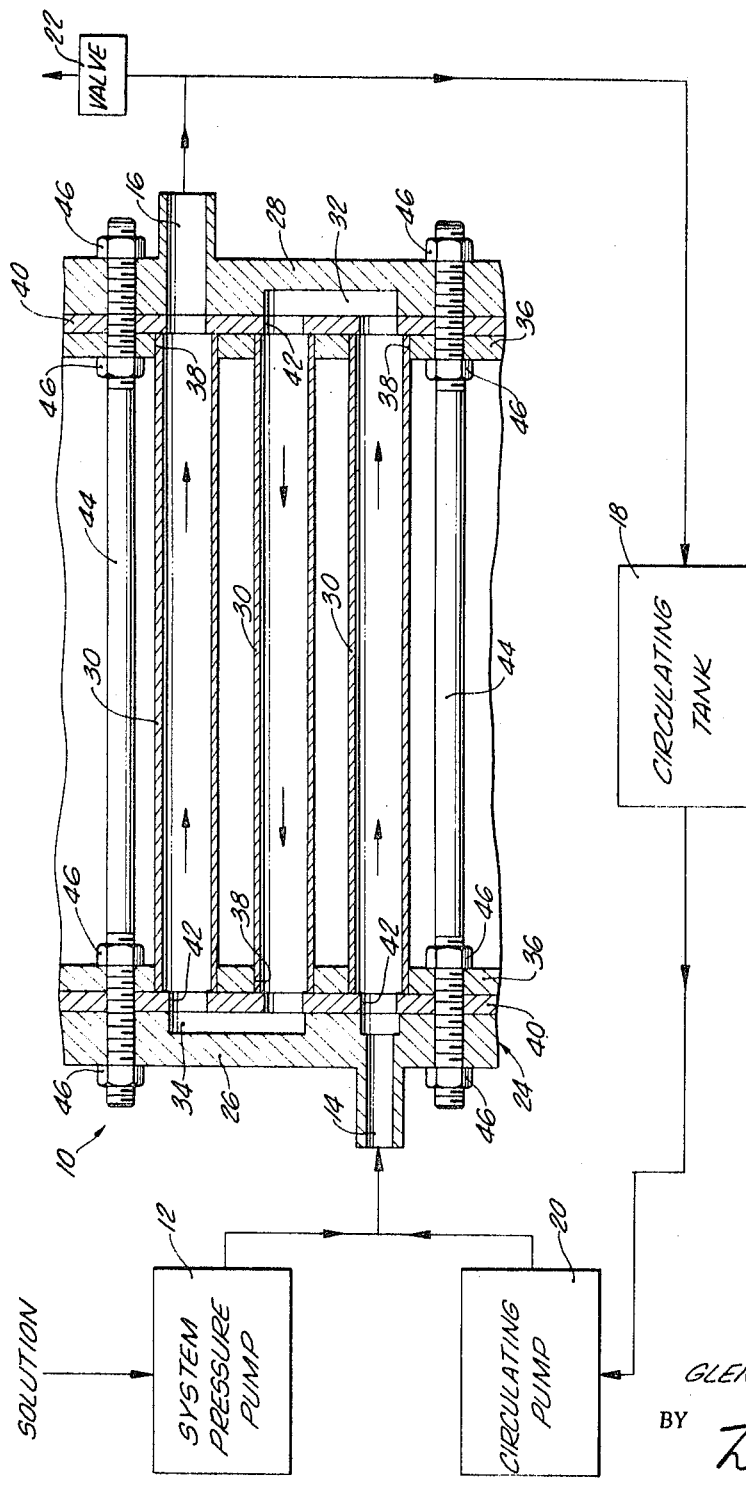

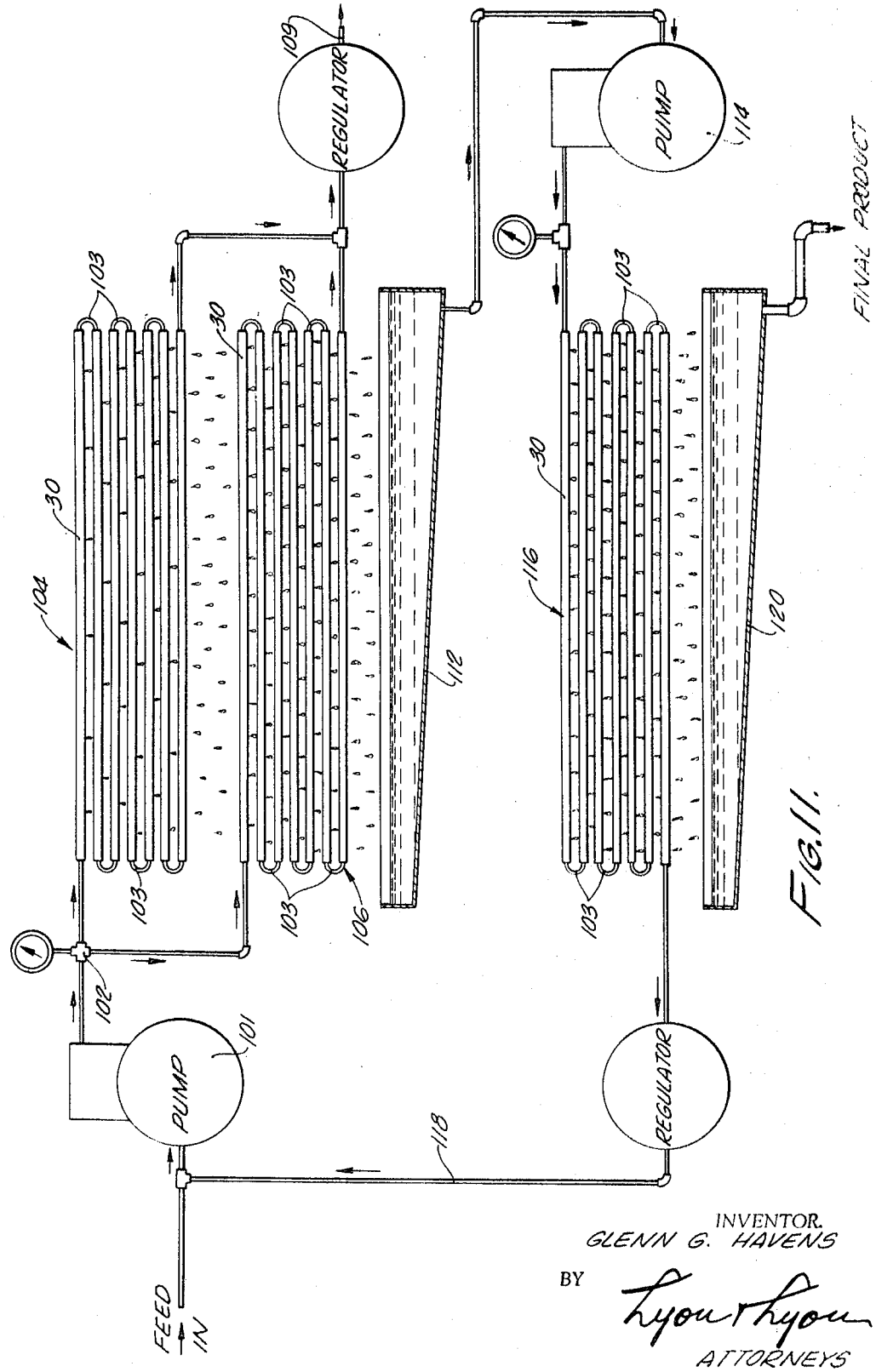

United States Patent Office 3,457,170
Patented July 22, 1969

3,457,170
SOLVENT SEPARATION PROCESS AND
APPARATUS
Glenn G. Havens, San Diego, Calif., assignor to Havens International, San Diego, Calif., a corporation of California
Continuation-in-part of applications Ser. No. 208,776, July 10, 1962, and Ser. No. 397,264, Sept. 17, 1964. This application Apr. 14, 1966, Ser. No. 549,741
Int. Cl. B01d 13/00
U.S. Cl. 210—23
24 Claims

ABSTRACT OF THE DISCLOSURE

Reverse osmosis separations, such as the desalination of sea water, can be accomplished by passing a solution under pressure through a porous resin-impregnated fibrous tube having a semipermeable osmotic membrane supported on the tube. When the pressure is in excess of the osmotic pressure, the solute is exuded through the walls of the tube and can be recovered.

---

The present invention relates to solvent separation by reverse osmosis and more particularly to a method and apparatus for effecting desalination of saline water. Although the present invention has particular utility for desalination of saline water, it is not limited thereto but may also be used for the separation or fractionation of various other substances where a solvent or solute is to be separated or fractionated from a solution.

This is a continuation-in-part of my application Ser. No. 208,776, filed July 10, 1962 for Solvent Separation Apparatus and Method of Manufacture and application Ser. No. 397,264, filed Sept. 17, 1964 for Solvent Separation Process and Apparatus, both now abandoned.

The prior art teaches the separation of a solvent from a solution by means of reverse osmosis using a semipermeable osmotic membrane, that is, a membrane which is permeable to a solvent in a solvent-solute solution. If a salt water solution is placed on one side of such a membrane and pure water on the other, water will diffuse from the pure water side through the membrane to the salt water side. This flow can be prevented or stopped by applying to the salt water a pressure equal to the osmotic pressure of the particular salt water solution. If a pressure higher than the osmotic pressure is exerted on the salt water, the flow will be from the salt water side to the pure water side, and desalinized water will pass through the membrane from the salt solution. The magnitude of pressure required for such reverse osmosis is proportional to the salinity of the water, less pressure being required for water of lower salinity. Representative osmotic membranes and osmotic pressures are disclosed in Loeb et al. U.S. Patents Nos. 3,133,132 and 3,133,137.

In the utilization of an osmotic membrane in a solvent separation process, inherent weakness of the membrane requires that it be supported in some manner, and the relatively high pressures involved necessitate the utilization of a membrane back-up structure which has relatively high structural integrity and strength. One proposal for supporting a membrane is to place a pre-cast membrane on a flat porous stainless steel plate with filter paper interposed between the membrane and the plate to prevent rupture of the membrane under the relatively high pressures sometimes necessary in reverse osmosis processing. The porous stainless steel plate heretofore used for this purpose is relatively expensive, particularly in view of the great number of such plates which must be used in order to produce an appreciable quantity of fresh water. Moreover, the pressure applied to the membrane limits the maximum plate area useable without structural failure of the plate unless, of course, the back-up plate is made thicker, which would be more expensive and more difficult to handle. Other problems are the requirement for edge sealing of the membrane; uneven flow distribution of the solution to be treated over the membrane surface which adversely affects the yield or flux of recovered solvent and leads to difficulty of the membrane plugging up and reduction in membrane life; and the necessity for use of expensive pressure vessel structures. Still another problem inherent in such apparatus is that the membranes, which are quite delicate and must be carefully handled to avoid damage, are initially cast on a glass plate or the like and are subsequently transferred to the back-up plate. The proper side of the membrane must face the solution in order for the membrane to function satisfactorily, since the membrane has only one efficient face. Careful and time-consuming process control is therefore necessary, particularly since identification of the efficient face is practical only with a microscope or the like. Consequently, although plate-type membrane support means have been successful to some extent on a laboratory scale, they have not been found adaptable to a commercial operation.

It has also been suggested that a tubular membrane be made and inserted in a porous tube, the tube serving as the membrane support. This proposal, however, required an extremely close tolerance fit between the membrane and the porous tube in order to prevent rupture of the membrane under reverse osmotic operating pressures. This close tolerance problem plus the extreme care required in handling the delicate membrane, make this approach impractical from a commercial production standpoint. Moreover, the only porous tubular supports heretofore suggested which might be sufficiently strong to withstand the necessary pressures are those of porous porcelain or the like, which would be prohibitively expensive for the large-scale production requirements of sea water desalination apparatus.

Thus it can be seen that the development of a commercially practicable solvent separation process using an osmotic membrane has been hampered in large part by the lack of a satisfactory membrane support means.

Accordingly, it is an object of the present invention to provide a novel solvent separation processing apparatus of the type utilizing a semipermeable osmotic membrane, which apparatus is not subject to the above and other disadvantages of those heretofore proposed.

Another object of the present invention is to provide a desalination apparatus which utilizes the reverse osmosis process to efficiently produce fresh water from brackish or saline waters.

It is also an object of the present invention to provide a novel tubular osmotic membrane support for a solvent separation apparatus.

It is also an object of this invention to provide a solvent separation processing apparatus employing a porous resin-impregnated fibrous tube as a support for a semipermeable osmotic membrane.

A further object of this invention is to provide solvent separation procesing apparatus utilizing a porous rigid fiber glass tubular membrane support.

It is a further object of the present invention to provide solvent separation processing apparatus utilizing an osmotic membrane mechanically interlocked with or bonded to a resin impregnated tubular membrane support.

Another object of the present invention is to provide a commercially practicable solvent separation process utilizing a semipermeable osmotic membrane.

A further object of this invention is to provide a solvent separation process and apparatus therefore utilizing a plurality of porous resin-reinforced glass fiber tubes for supporting semipermeable osmotic membranes.

Other objects and advantages of this invention will be readily apparent from the following detailed description of preferred embodiments thereof when read in connection with the accompanying drawings.

In the drawings:

FIGURE 1 is a transverse cross-section of a tubular structure embodying the present invention;

FIGURE 2 is a transverse cross-section of a modification of the tubular structure shown in FIGURE 1;

FIGURE 3 is a fragmentary sectional view taken on line 3—3 of FIGURE 2;

FIGURE 10 is a diagrammatic view partially in section illustrating a solvent separation apparatus utilizing a tubular structure embodying the present invention;

FIGURE 11 is a diagrammatic view illustrating a novel two-stage desalination process utilizing the solvent separation apparatus of the present invention;

FIGURE 12 is a fragmentary vertical cross-section partially schematic, of another form of tubular structure embodying the present invention;

FIGURE 13 is a diagrammatic view of apparatus used to test the solvent separation apparatus of the present invention;

Figure 4:
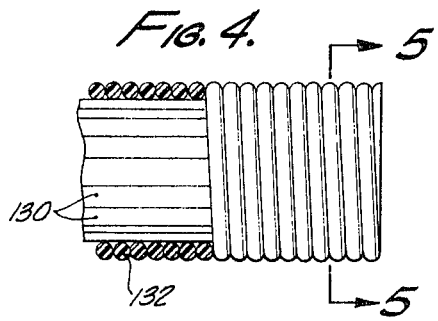
FIGURE 4 is a side view, partially in longitudinal section, of a further modified tubular structure embodying the present invention.

Briefly described, the present invention relates to a novel separation assembly which comprises an osmotic membrane and a porous tubular support therefor, and a method and apparatus for utilizing such separation assembly in reverse osmosis separations. The present invention comprehends within its scope tubular members of resin-impregnated fiber which are suitable for directly supporting the fragile semipermeable osmotic membranes, which have sufficient strength to withstand the pressure requirements of reverse osmosis and sufficient rigidity under such pressure conditions to prevent deformation damage to the membranes, and yet which have the necessary porosity for passage of the solvent separated through the membranes. Also comprehended within the scope of the present invention is a unitary structure comprising a semipermeable membrane affixed or coupled to any type of suitable porous support tube, as by a mechanical interlocking or bond between contiguous portions of the membrane and the tube. Most advantageously these features are combined to overcome the deficiencies of the aforementioned and other prior art solvent separation structures.

Solvent separation is accomplished in the present invention by placing the solution to be treated in contact with one side of a semipermeable osmotic membrane and subjecting the solution to a pressure in excess of its osmotic pressure. The precise mechanism or mechanisms by which solvent passes through an osmotic membrane has not been fully determined. One theory assumes that the membrane is a sieve, the solvent passing through very fine pores in the membrane. According to the more recent "bound-water" theory, the solvent is transferred by successive hydrogen bonding through the membrane, for example in a cellulose acetate membrane by bonding of water molecules (solvent) to hydroxy groups of the cellulose acetate polymer and transfer of the molecules to adjoining hydroxy groups under the influence of the reverse osmotic pressures.

The various types of semipermeable osmotic membranes known to those skilled in the art are useful in the present invention. Any substantially monomolecular polymeric film of controlled permeability may be suitable. Specific films include, but are not limited to films of cellulose acetate, cellulose triacetate, cellulose propionate, polyvinyl alcohol, cellulose acetate-butyrate, ethyl cellulose, methyl methacrylate, etc. Particularly efficacious are membranes which may be deposited or coated on a porous tubular membrane support member to facilitate the establishment of a unitary structure therewith. For example, a film of a modified cellulose solution can be deposited or coated directly on the surface of the porous membrane support member. The mixed solution is applied to the membrane support structure by any suitable process to obtain a substantially uniform thickness. An especially suitable technique which has been developed for forming the semipermeable membrane of the type useful in my present invention on the inside of a support tube is disclosed in my copending application Ser. No. 374,928, filed June 15, 1964 for Coating Method and Apparatus, which is incorporated herein by reference. Briefly, this technique provides a coating on the inside of the tube of a film approximately 0.010 to 0.015 inch thick. The film is then treated in accordance with known membrane treatment techniques to provide a membrane approximately 0.003 to 0.004 inch thick having optimum desired solvent separation characteristics.

It is not necessary to satisfactory operation that the membrane be bonded to the support structure. However, bonding has occurred in some cases and its desirability may be explained as follows. A membrane coating solution deposited on a support structure may have a tendency to shrink away from the structure as it dries. When the membrane is then used for solvent separation, the relatively high osmotic pressure may tend to force the shrunk membrane against the support causing tensile failure of the membraane in stretching the shrunk membrane to the size of the back-up tube and/or rupture (shear failure) of the membrane as it is forced into the gaps or pores of the tube. By making a porous tube supported membrane with a suitable bond between the membrane and the support tube, any tendency of the membrane to shrink away from the support tube is inhibited, and the membrane at least partially fills the larger pores of the support tube near the surface, across which membrane rupture would otherwise occur when osmotic pressure is applied to the opposite side of the membrane.

In the formation of a mechanical bond or interlocking connection between the membrane and the resin impregnated fibrous tube, portions of the membrane coating solution enter some of the tube pores during the coating process, and enclose or encircle portions of at least some of the individual fibers and/or groups thereof in and adjacent the tube surface whereby those fibers are partially embedded in and remain as such in the finished membrane layer.

With reference to the tubular membrane support structure, the tube must have adequate porosity in the form of interconnected voids to permit the solvent which is passed through the membrane to pass through the tube, but on the other hand the tube if used without auxiliary back-up means, must have sufficient bursting strength to withstand the relatively high pressures necessary for reverse osmosis processing. If an auxiliary back-up means such as a perforated steel tube is employed around the membrane support tube, the latter tube must at least have sufficient strength and rigidity to support the membrane and to permit necessary handling. Normally, however, the tubes are constructed for use without any auxiliary back-up means and consequently must have sufficient structural integrity and rigidity to prevent bursting or excessive bulging, either of which would result in rupture of the membrane during the solvent separation operations.

As previously stated, the membrane support structure of my present invention may be any suitable porous tube. However, it has been found that porous tubes of synthetic resin are well suited to use as support members and resin impregnated glass fiber tubes are particularly efficacious. The combination of high strength porosity which can be achieved using plastic or resin tubing makes such tubing an ideal support member.

Any water insoluble resin may be used for the supporting tube either alone or to impregnate the fibrous tube if it will give the required tube strength. Among the resins which are suitable for this use are phenolics, epoxies, polyurethanes, polyesters, acrylics, etc. Thermosetting resins such as the phenolic resins have been found to be particularly useful since they are readily deposited or coated from a liquid solution and may be cured rapidly while still retaining good physical properties. Thermoplastic resins such as polyethylene, polyvinyl chloride, polystyrene, etc. may also be used, however.

In using phenolic tubes, it has been observed that water passing through the tube may contain a small amount of phenol. Although this low concentration of phenol does not appear to be objectionable, any tendency of the tubes to exude phenol can be substantially eliminated by various means, e.g., vacuum baking of the tubes. It has also been noted that polyurethane shows a water sensitivity which may result in structural weakening over a prolonged period of use.

It has been found that the necesary porosity can be imparted to the tubing by a number of methods. For example, when a resin impregnated glass fiber tube is used, open spaces or interstices between individual fibers in the glass fiber tubes may be formed. Subsequent impregnation of the fiber glass tube with resin will tend to fill up the pores in the fiber glass tubing. However, if the resin content is maintained at a relatively low level, a large number of the pores or voids in the fiber glass tubing may remain unfilled with resin and the resulting reinforced fiber glass tubing will have porosity to permit solvent to be passed through it. It should also be kept in mind that part of the porosity may be due to voids within the strands of fiber glass. When porosity is produced by using a low resin content, it can be seen that one must generally sacrifice strength for porosity.

Another method of producing porosity in a resin tubing without an accompanying significant decrease in strength is through the use of blowing agents. In general, a blowing agent can be considered any source of gas which is liberated during curing of the resin to produce voids in the resin as it escapes from the resin to the atmosphere. The gas may be liberated as a result of vaporization of a solvent, the resin itself, or by-products of the polymerization reaction. Blowing agents which produce gas may also include chemicals within the resin mixture which will react to form a gas. In addition, external means of introducing a gas into the resin such as blowing gas through holes in the mandrel on which the tube is formed may be employed. Many combinations and modifications of these methods may be employed to obtain the desired product characteristics. The use of blowing agents is well-known to those skilled in the art and commonly used in the production of foamed plastics. It should be kept in mind, however, that the purpose of the blowing agent when used in forming the support member of this invention is not to form a highly foamed low density plastic, but rather to form a strong high density material having only sufficient voids to provide for passage of solvent.

As previously indicated, blowing or pore forming may be the result of vaporization of material normally present in the liquid resin mixture. For example, in the case of polyesters, the monomer can be styrene, diallyl phthalate, or a combination. Some porosity is achieved by subjecting the uncured laminate to excessive heat, thereby vaporizing some of the monomer before it has a chance to polymerize. Also, in the formation of an epoxy resin, during the extended cure cycle, some boiling off and blowing will occur if an excessive amount of allyl glycidyl ether is added. Furthermore, solvents used in connection with the monomers may tend to cause some blowing. For example, in conjunction with phenolics, the vaporization of the ethanol solvent will produce blowing with resulting porosity. Preferred vaporizable blowing agents include toluene, $H_2O$, benzene, hexane and ethanol.

Other blowing agents which produce gas by vaporization include aliphatic hydrocarbons, aliphatic halogenated hydrocarbons, and aliphatic fluorocarbons. The useful aliphatic hydrocarbons include those containing isomer of $C_5$ to $C_7$ obtained from low boiling fractions of petroleum. Methylene chloride has been used for expanded polyurethane and chlorinated ethylenes have been used in forming foamed epoxies. Aliphatic fluorocarbons possess many desirable characteristics as foaming agents and may be used for polyurethane, epoxy, phenolics, etc.

The foaming gas may also be generated by chemical means. For example, the cell-forming gas can be produced as a by-product of a chain extension or crosslinking of the polymer as in the formation of polyurethane with carboxyl-bearing alkyd resin and an isocyanate or between polyurethane resins with end-standing isocyanate groups and water. Similarly, the condensation of phenol and formaldehyde produces water as a by-product which in the form of steam is capable of foaming the resulting phenolic resin.

Another type of chemical foaming agent is one which decomposes to librate a gas. Examples of suitable decompositioned type foaming compounds are azo-compounds such as azoisobutyronitrile which has a decomposition temperature of about 105–120° C. and is sold under the trade name Genitron AZDN by Whiffen; N-nitroso-compounds such as N,N'-dimethyl-N,N'-dinitroso terephthalamide which decomposes at temperatures from 80–100° C. and is sold by du Pont under the name Nitrosan; azodicarbonamide, which decomposes at 195–200° C. and is sold by Naugatuck Chemicals under the trade name Celogen A2. A particularly suitable blowing agent is an ester of azodicarboxylic acid which decomposes at 200–205° C. and is sold by Naugatuck under the name Exre. Also suitable are sulfonyl hydrazides such as 4,4' oxybis (benzene sulfonyl-hydrazine) which decomposes at temperatures of from 150–160° C. and is sold by Naugatuck under the name Celogen OT. Other decomposition type blowing agents include urea/biuret mixtures which decompose at from 150–165° C. Also, simple salts such as ammonium bicarbonates, ammonium carbonates and ammonium oxalates which decompose at the temperatures of from about 36–60° C. may be used.

The uniformity and size of pores in a given situation may be controlled through the use of a wetting agent. For example, 1% of a wetting agent (e.g., Tween 40 from the Atlas Chemical Co.) may be used to give a uniform distribution of small pores in a phenolic resin.

Although any method of obtaining porosity including those above described may be used, the preferred method of obtaining the porous supporting tube of this invention is to use a blowing agent and also control resin loading.

Figure 6:
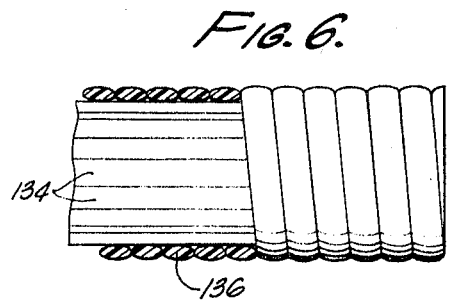
FIGURE 6 is a side view, partially in longitudinal section, of a further modified tubular structure embodying the present invention.
Figure 5:
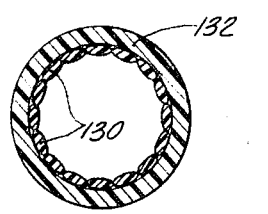
FIGURE 5 shows a transverse cross-section taken on line 5—5 of FIGURE 4.
Figure 7:
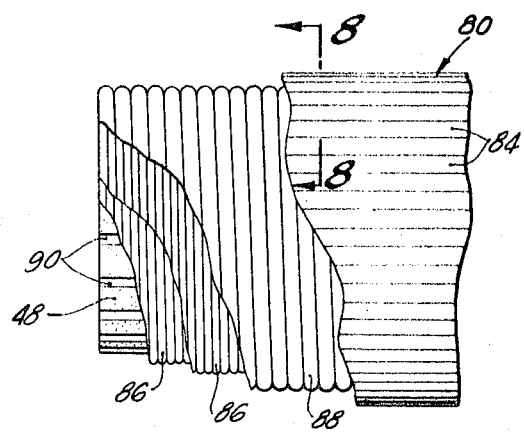
FIGURE 7 is a fragmentary side elevational view of another form of tubular structure embodying the present invention, such view being broken away to show the internal construction of said tubular structure.
Figure 9:
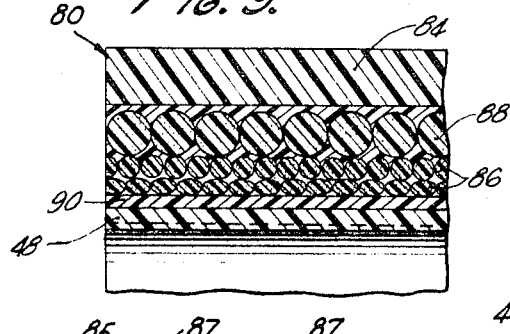
FIGURE 9 is a fragmentary vertical sectional view taken on line 9—9 of FIGURE 8.
Figure 8:
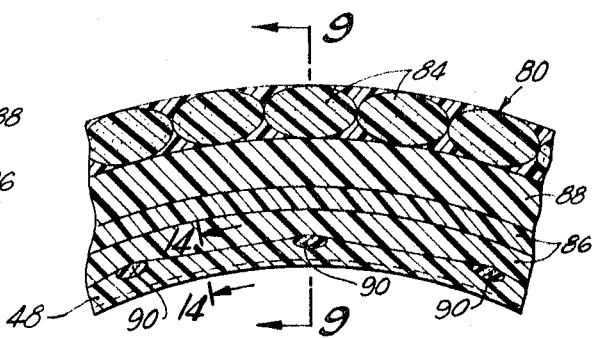
FIGURE 8 is a vertical sectional view taken on line 8—8 of FIGURE 7.

It has been found that resin reinforced fibrous tubing is particularly adaptable to this use, having relatively high tensile strength and modulus of elasticity, and although any fibrous tube which is adequately reinforced would suffice, it has been found that resin reinforced glass fiber tubes are particularly suitable. Such glass fiber tubing has been made by a number of methods, for example, by filament winding, e.g., forming two or more layers of fiber yarn about a forming mandrel, or by wrapping a fabric woven from glass fibers about a mandrel. Normally the resin is applied and cured during the tube forming operation. A method and apparatus for making a resin reinforced fibrous tube of the type suitable for use in my present invention is described in my copending applications, Ser. No. 374,927 filed June 15, 1964, now Patent No. 3,332,815, entitled Method and Apparatus for Continuously Forming Elongated Hollow Articles and Ser. No. 449,054 filed Apr. 19, 1965, entitled Method and Apparatus for Forming a Tubular Member Continuously, the disclosures of which are incorporated herein by reference. A tube of the type described in the foremention copending application is shown in FIGURES 7 through 9 and described in detail below. A method of making resin reinforced fibrous tubing is also described in U.S. Patent No. 3,216,876 to Tyhurst. Other types of wound yarn fiber glass tubing useful herein as shown in FIGURES 4 to 6 and will be described hereinafter.

Fiber glass tubes useful in my present invention may also be formed by cutting a B-staged phenolic or other resin impregnated glass fiber cloth into an approximately ¾ inch wide strip or ribbon and spirally winding such strip sequentially about a mandrel which has been previously coated with a suitable parting agent such as Franklin's wax. Each ribbon is wound on a bias with respect to adjacent ribbons to give the tube maximum strength. The ribbon-wrapped mandrel is then wrapped with cellophane to provide pressure upon curing. The cellophane is preferably precoated with a parting agent such as Methocel to permit removal of the cellophane after curing. The assembly is then heated in an oven to about 180° C. and kept at that temperature for approximately two hours for curing. The cured tube is then separated from the mandrel and the ends faced off.

Other fabrication methods may be employed, including techniques such as extrusion, die casting or molding and the like.

The amount of resin impregnate used in the tube must be sufficient to impart the required strength and rigidity to the tube. However, if porosity between fibers is to be maintained, the amount of resin added should not be so great as to reduce the porosity of the tube to a degree rendering it ineffective in passing the solvent extruded through the membrane. To obtain optimum affixation of the membrane to the tube, the resin does not completely surround all portions of all the fibers at and adjacent the tube surface, so that the above-described embedding of fiber portions in the membrane can be effected. Hence the membrane support should have a relatively high porosity, i.e., the pores or interstices of the tube should not be completely filled with resin.

The porosity of the tube is determined by the porosity of the fiber strands themselves (which are each made of hundreds of minute glass fibers) and also the voids in the resin and between fibers. It can thus be seen that the porosity will be greater as the resin content is decreased. In obtaining a satisfactory tube, it is desirable to have a sufficient amount of resin present to give adequate strength and yet keep the amount of resin to a low enough level so that there is sufficient porosity. Generally, a resin content of approximately 3 to 25% and preferably 10–20% by weight will normally result in the desired porosity. This, of course, will depend somewhat upon the particular resin being used and the winding of the glass fibers. It should be noted that although the resin is more or less uniformly distributed along the tube longitudinally, the resin loading between the inner and outer surface of the tube may not necessarily be uniform and, in fact, preferably varies from about 3% on the innermost fibers up to about 16–18% on the outer fibers. The lower resin content on the fibers nearest to the membrane provides for low resistance, as back pressure, to escaping water. Resin density is higher at the outer surface of the tube to provide structural strength. Sufficiently high resin density is desirable at the inner surface of the tube, however, to limit excessive penetration of the membrane solution into the tube structure and reduce the size or span of the pores or air gaps to thereby prevent membrane rupture due to shear failure as the supported membrane is subject to reverse osmotic operating pressures. It is sometimes desirable, as will be seen from the following description of the tube structure shown in FIGURES 2 and 3, to add an inner layer of small gage yarn to obtain sufficient surface smoothness at the inner surface of the tube.

Referring now more particularly to the drawings, FIGURE 1 shows a porous tube 30 used as a back-up or support for the solvent separation membrane 48. The tube 30 of this embodiment comprises the single spiral wound phenolic-resin impregnated glass fiber cloth ribbon structure described above. The membrane and tubular support are shown as actually used in solvent separation processing with the solution 100 pumped through the tube under pressure and separated solvent 61 shown as it appears as droplets on the outside of the porous tube.

A modification of the membrane support structure shown in FIGURE 1 is shown in FIGURES 2 and 3 wherein a single layer 60 of glass fiber yarn is formed inside the tube 30a as a membrane back-up or support to increase the resin density of the tube near its inner surface and thereby reduce the possibility of membrane rupture and consequent leaking of the membrane. The yarn layer 60 may be formed integrally with a filament-wound tube in accordance with my aforementioned copending application Ser. No. 374,927, or it may be provided on the type of tube shown in FIGURE 1. In the latter case, the yarn, such as single end glass fiber yarn approximately 0.007 inch in diameter, is fed onto a mandrel coated with a suitable parting agent, until the proper length of the layer 60 is produced, and a thin layer of resin solution is then lightly wiped over the yarn layer 60 and preferably allowed to dry. The ribbons of resin impregnated glass fiber fabric are then spirally wound over this yarn to form the tube. The resin wiped upon the outside of the yarn layer 60 facilitates bonding of the yarn 60 to the ribbon of resin impregnated glass fiber fabric. The tube is then cured and processed as previously described, and the membrane formed upon the interior of the yarn layer 60.

Figure 15:
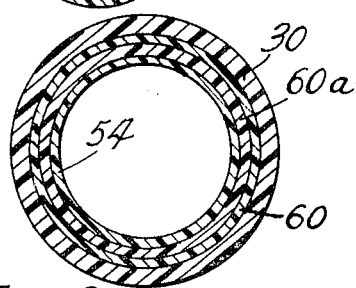
FIGURE 15 is a transverse cross-section of a modification of the tubular structure shown in FIGURE 1.

As previously mentioned, it is desirable to have an area of high porosity adjacent the membrane. This can be accomplished by having a low resin content in this area or by placing a layer of high porosity material, shown as 60a in FIGURE 15 between the membrane and support tube.

Any type of porous mat such as filter paper, felted cotton linter paper, etc. may be employed. The layer of porous material may be bonded to the tube, but the layer should be substantially dry with no appreciable impregnation by the resin. The mat also tends to prevent puncturing of the membrane by shielding the membrane from random ends of glass fiber which might otherwise protrude into the tube and puncture the membrane. The layer of high porosity material may be formed with the glass fiber tube by applying it first to the mandrel and then winding the glass fibers, by applying it after a thin layer of glass fibers has been wound or in any other desired manner.

Tube structures of the type shown in FIGURES 2 and 3 have been made having an inside diameter of approximately ½ inch, a wall thickness of at least about 0.015 inch, and will withstand internal fluid pressures as high as 3000 pounds per square inch or more. Although many different resin reinforced glass fiber structures would be suitable as membrane support tubes for the present invention, it is preferred that a substantial portion of the fibers be aligned circumferentially to provide adequate bursting strength.

As previously stated, the membrane back-up layer 60 reduces and substantially eliminates the possibility of rupture and consequent undesirable leakage of the membrane 48, as the layer 60 reduces the span of the relatively large openings or pores of the tube which the membrane must bridge. For example, assuming that the thickness of the membrane 48 in FIGURES 2 and 3 is .003 to .004 inch and the yarn strand of layer 60 is about .007 inch in diameter, there would be no measurable gap between the strands. However, when the tube is subjected to pressures in excess of osmotic pressure, the yarn strands may be caused to spread apart slightly causing gaps of up to about .001 inch. Disregarding the resin filling, the interstices in a fiber glass found tube made with fabric strips are approximately .005 inch across so that the yarn layer 60 effectively reduces the .005 inch opening or gap to about a .001 inch gap. Thus, the possibility of shear failure or rupture of the .003 inch membrane across the pore opening or gap it must bridge, is reduced considerably by the inner layer 60 of small diameter yarn.

FIGURES 4 and 5 show a modified form of resin impregnated glass fiber tube which employs two layers of yarn comprising a layer of inner longitudinally disposed rovings 130 around which a layer of glass fiber yarn 132 is circumferentially wrapped. FIGURE 6 shows yet another form of the tube useful in the present invention wherein a two-layer resin impregnated glass fiber tube is formed using an inner roving layer of longitudinals 134 and a circumferentially wound layer of rovings 136 as the second or outer layer. A structure found to be particularly suitable comprises an inner layer of longitudinal rovings and two layers of rovings circumferentially wrapped to form a slight helix, the second circumferential layer being counter rotated to give a helix opposite to the first helix. The rovings have a diameter of approximately 0.008 to 0.01 inch and may form a tube with a 0.56 O.D. and a 0.5 I.D. The inner surface of the tube is coated with a cellulose acetate membrane about 0.004 inch thick.

FIGURES 7 through 9 show another form of resin impregnated glass fiber support tube 80 having exceptionally high strength utilizing five layers comprising a layer of spaced apart inner longitudinals 90, two layers of relatively small diameter circumferential strands 86, a larger layer of circumferential yarn 88, and an outer continuous layer of longitudinally disposed rovings 84.

The glass fiber yarn used in the construction of the porous tube for use in the present invention may be any commercially available relatively small diameter glass fiber yarn, each strand comprising a bundle of minute glass fibers which are assembled as yarn by any conventional method. For example, the smallest yarn commercially available, the 1/0 (single strand) yarn contains 204 glass fiber filaments per strand. The fibrous yarn is normally twisted slightly to facilitate handling the yarn on a tube winding machine, however, the amount of twist in the yarn at least for the yarn used in the innermost circumferential layer in the support tube of the present invention may be limited so that flattening of the yarn during the tube forming process is not prevented. This flattening may be desirable since it tends to reduce the gap that must be bridged by the membrane. For example, the 1/0 yarn of the type used for the inner layers of the tubes shown in FIGURES 2, 3, 7, 8 and 9 may be twisted one turn per inch, yarn having this amount of twist being designated "1z." The 2/2 yarn used in FIGURES 4, 5, 7, 8 and 9 may be twisted 3.8 turns per inch. The rovings would then be untwisted. The flattening, however, may not be uniform, and thus the developed width or "gap" between adjacent yarns may vary. Another method of reducing a gap is to mash yarns (and rovings) cheek-to-cheek which tends to squash them into a cross-section approaching a square.

The glass fiber yarn is preferably coated with a suitable sizing material, for example of the metal complex or the silane types, which enables the resin impregnate to wet the glass fibers, and improves resistance to water aging.

The semipermeable osmotic membrane employed in the present tubular apparatus, designated generally at 48, is preferably a film of modified cellulose acetate deposited or coated directly onto the inner surface of each porous support tube from a prepared solution. A skin 54 is formed on the surface of the membrane facing the solution by appropriate membrane treatment and the solvent separation is believed to be effected primarily by this skin 54. One solution suitable for making such membranes includes cellulose acetate, acetone, and an aqueous solution of magnesium perchlorate, the ingredients being completely mixed by a convenient means such as a shear mixer. The viscosity of the coating solution at the coating temperature is controlled by the acetone content to provide the desired coating thickness and solution penetration into the tube pores. The mixed solution is applied to the inner surface of each tube by any suitable process to form a membrane 48 of a substantially uniform thickness. As heretofore stated, one method of such application is disclosed in my copending application Ser. No. 374,928, wherein a cylindrical doctor blade (not shown) is inserted within the tube 30 for application of the coating solution, preferably cooled to below room temperature. The doctor blade is slowly moved longitudinally relative to the tube to remove excess solution and thus provide a uniform cellulose acetate solution film. The freshly coated tube 30 is then dried, preferably at a lowered temperature for approximately ½ to 1 minute in the presence of moving air and thereafter contacted with water. An air, water, and evolved acetone mixture is removed from the surface of the membrane by imposing a vacuum on the moving section of the tube. The freshly coated tube is then placed in an ice water bath at about 0–10° C. for about one hour to permit further acetone evolution and perchlorate salt removal which aids in forming the porous structure of the membrane 48. The tube is then transferred to a 70–85° F. water bath and maintained at that temperature range for at least 15 minutes, to aid in obtaining the desired solvent separation characteristics. The completed tubes are stored in water or at least humid conditions.

Another convenient solution for applying the membrane is a solution of cellulose acetate in acetic acid. The preferred ratio of acetic acid to cellulose acetate is from 3:1 to 7:1. It has been found that the presence of from up to 5 or 10% water may also improve the physical characteristics of the solvent and make application easier.

A method of forming a membrane is described in copending application Ser. No. 504,044 filed Oct. 23, 1965 by Julius C. Westmoreland and entitled Method for Preparing a Membrane, the disclosure of which is incorporated herein by reference.

Figure 14:
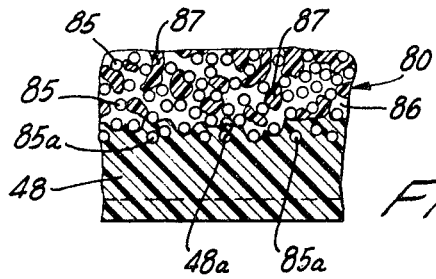
FIGURE 14 is an enlarged, diagrammatic, fragmentary sectional view taken substantially on the line 14—14 of FIGURE 8.

FIGURE 14 is a highly magnified, diagrammatic sectional view taken on the line 14—14 of FIGURE 8, showing the manner in which the membrane 48 may be mechanically bonded or coupled to the porous tube 80. It is to be understood that only a portion of a single strand of the innermost circumferentials 86 is shown and it is to be further understood that for purposes of clarity of illustration the sizes of and spacings between the individual fibers 85 and the showing of the portions 87 of the impregnated resin, as well as the configuration of the membrane surface 48a, have been exaggerated. Nevertheless, FIGURE 14 does depict the manner in which the membrane coating solution enters the interstices of the tube structure and surrounds or encloses portions of individual fibers and/or groups of fibers 85a, so that in the completed structure as shown, portions of at least some of the fibers in and adjacent the inner peripheral surface of the tube are fully embedded in the membrane, and the membrane surface 84a adjacent the tube at least partially fills many of the interstices of the tube in and near the surface thereof. This provides an excellent connection between the membrane and tube with the resulting advantageous unitary structure.

The solvent separation tubes of the present invention are used primarily with membranes designed to remove water from various solutions such as saline water, fruit juices, sugar beet molasses, beer, etc. Thus, it can be seen that the desired product may be the concentrated solution flowing through the tube rather than the exudate of pure water. Other type membranes, however, could be used in apparatus of the present invention to remove other materials and solvents from solutions according to the characteristics of the particular membrane employed.

In FIGURE 10 a relatively simple reverse osmosis solvent separation unit is designated generally at 10. In unit 10, solution enters the system through a pressure pump 12 which maintains the solution in the system at a pressure of sufficient magnitude to effect reverse osmosis such as, for example, a pressure of at least 350 pounds per square inch for sea water. The optimum operating pressure depends upon the composition and concentration of solids in the solution, the composition and thickness of the membrane, the solution temperature, and other variables not pertinent to the present invention. The output of the pressure pump 12 is coupled to an inlet 14 of the unit 10. The solvent is circulated through the apparatus 10 and after passing through the unit, passes out of the unit 10 through outlet 16, and into a circulating tank 18 which discharges into a circulating pump 20. Pump 20 maintains continuous circulation of the solvent through the unit 10, the outputs of the pump 20 and 12 being regulated by any suitable valving means (not shown) whereby each is effective to perform without unnecessary overloading of the other.

During operation of the unit 10, the solute concentration will gradually build up to a level at which it is relatively inefficient to attempt further solvent extraction and a normally closed pressure regulating valve 22 is provided in the circulation system to discharge enough of the concentrated solution to maintain a predetermined pressure. Valve 22 can also be automatically operated by a suitable solute concentration monitor (not shown) which may be located in the circulating tank 18.

Referring again to FIGURE 10, the apparatus 10 comprises a pressure vessel 24 preferably cylindrical in configuration, having a pair of circular walls 26 and 28 incorporating, respectively, the inlet 14 and the outlet 16. For simplicity, only a portion of the vessel 24 is illustrated. The inlet 14 is in fluid communication with one end of an elongated solvent separation tube 30 which embodies the present invention. Tube 30 extends in coaxial relationship to the cylindrical pressure vessel 24, and the opposite end of the tube 30 is in fluid communication with the passageway 32 provided in the end wall 28 of the pressure vessel 24. Passageway 32 is in fluid communication with one end of another tube 30, the opposite end of which is in fluid communication with the passageway 34 provided in the end wall 26. The passageway 34 is in fluid communciation with one end of a third tube 30, the opposite end of which is in communication with the outlet 16 of the pressure vessel 24. Thus, a plurality of tubes 30 are connected in series relationship, and solution under pressure is constantly circulated therethrough for eventual discharge through the outlet 16. It is to be understood that the tubes may be connected in parallel if desired, or a combination of series and parallel may be used.

The tubes 30 are held in position by a pair of circular end supports 36 having axially aligned openings 38 for receiving the opposite ends of the tubes 30. The end supports 36 are disposed adjacent the end walls 26 and 28 with a pair of gaskets 40 interposed between the end supports 36 and their adjacent end walls to provide a fluid tight relationship. The gaskets 40 include a plurality of openings 42 to permit the circulation of solution through the various tubes 30.

The relatively high pressures existing in the tubes 30 produce axially directed force components which are resisted by a plurality of elongated tie-rods 44 whose opposite ends are each suitably threaded to receive a pair of nuts 46 for securing together the end supports 36, gaskets 40, and associated end walls 26 and 28 at each end of the pressure vessel 24 as well as for securing the end walls 26 and 28 against separation.

Separated solvent, such as potable water in the case of treatment of saline water, passes through the membranes and tubes 30, exuding therefrom in the form of the droplets 61, the droplets falling from the tubes and collecting at the bottom of the vessel 24 from which it is drawn off through a suitable opening (not shown) for use.

For simplicity purposes, only three tubes are described and illustrated in the unit 10. In practice a great plurality of such tubes are manifolded together in a compact bundle to provide a solution path having a length commensurate with the desired solvent extraction rate. For example, a package of approximately 65 of the tubes 30, each one ½ inch in total diameter, 12 inches long, and connected in series, provides a solution path length such that a stream of saline water entering the tubes 30 at approximately 8 feet per minute, with a salt content of approximately 3.5%, yields half brine and half potable water, the brine leaving the tube at a velocity of approximately 4 feet per minute with a salt concentration of approximately 7%. Under favorable conditions this bundle of tubes 30 will produce approximately 50 to 100 gallons of potable water per day, depending upon a number of variables, including the nature of the semipermeable membrane material which is utilized. Many bundles of such tubes 30 would be coupled together in an apparatus such as the unit 10 to serve larger water conversion installations.

FIGURE 11 shows a two-stage desalination unit which is illustrated in conjunction with a sea water feed. The water recovered from the first stage is subsequently pumped through a second stage where the salinity is further reduced to potable levels. Potable water passes through the membranes 48, exudes from the tubes 30 as indicated by the droplets 61 in FIGURES 1 and 2, and collects in tank 120 of FIGURE 11. Sea water is initially pumped by means of pressure pump 101 into the first stage through a fitting 102 where it is directed to two modules 104 and 106, each having 46 six-foot-long tubes connected in series by means of pressure, fittings 103. In one such installation, operating at a typical pressure of approximately 800 p.s.i., 200 gallons of water per day containing 2100 p.p.m. salt was produced from 1180 gallons of sea water pumped through the first stage, representing a yield of 2.2 gallons per square foot of membrane per day. The concentrated sea water from the first stage is discharged from the system through pipe 109. The water yield from the first stage is collected in tanks 112 and drawn into the second stage pressure pump 114 where it is pressurized to approximately 500 pounds per square inch and passed through the second stage, comprising a series of 42 desalination tubes designated as 116. The discharge from the second stage is recirculated to the first stage into pressure pump 101 through line 118. The second stage yield of about 160 gallons per day of water containing 200 p.p.m. salt is collected in tank 120.

FIGURE 12 illustrates another form of apparatus in which a pressure vessel 62 is filled with solvent 64, and which includes a plurality of suitable openings 66 for receiving a corresponding plurality of cylindrical fittings 68. Each fitting 68 includes an upper collar which rests upon an annular gasket 71 to prevent leakage between the fittings 68 and the pressure vessel 62, and mounts a porous tube 70 in fluid-tight relationship. Each tube 70 is adhesively bonded to its fittings 68 and extends interiorly of the vessel 62 into the solution 64. Each tube is substantially identical to the tube 30 previously described in connection with FIGURES 1 to 6, except that the upper end of each tube 70 is closed by an integral end wall made of the same material as the cylindrical wall.

The exterior of each tube 70 is coated with a cellulose acetate soltuion to provide a porous semipermeable osmotic membrane 72 substantially identical to the membrane 48 except for the difference in configuration and placement evident in FIGURE 12. Potable water may be produced by this system by the application of pressure to the interior of the vessel 62, causing water to be forced through the membranes 72, through the walls of the tubes 70 and into the interiors of the tubes 70, from where the water is drained into a suitable collection tank (not shown). A membrane backup layer 60 shown in FIGURES 2 and 3 may be interposed between the interior circumferential surface of each tube 70 and the osmotic membrane 72. The embodiment of FIGURE 12 is particularly useful for applications having special requirements, such as when it is preferred to exteriorly rather than interiorly coat the solvent separation tubes to form the semipermeable solvent separation membranes.

The following examples serve to further illustrate the present invention, but it is to be understood that the invention is not limited to the specific details set forth:

Example I

A resin impregnated fibrous glass filament wound tube of the structure shown in FIGURES 7-9 was made with the apparatus and method described in my aforementioned copending application Ser. No. 374,927, filed June 15, 1964, for Tube Making Apparatus. Thirty glass yarn longitudinal pullers to provide the inner longitudinal 90 (Owens-Corning ECG 150–1/0 1z yarn) were unreeled and placed under approximately one ounce tension and run through a transverse guide after which they were passed through a resin coating tank containing a 25% ethyl alcohol solution of Narmco #2102 structural resin (viscosity of 60 to 100 seconds efflux time at room temperature in a Zahn #2 cup) and then passed through an air drying oven operated at 160–170° F. to cure the resin to the B-stage condition. Narmco #2102 resin is a mixture of alcohol solutions of two parts nylon (e.g. du Pon'ts Zytel 61) and three parts of a one-stage resol type phenolic resin. The oven-dried resin impregnated longitudinals were then passed through a stearic acid bath at 140° F. and placed under approximately three ounces tension after which they were guided and spaced circumferentially around a slowly rotating polytetrafluoroethylene coated steel mandrel, coated with a Dow-Corning mold release silicone. Two layers of Owens-Corning ECG 150–1/0 1z fibrous yarn to form the circumferentials 86 and a third layer of Owens-Corning ECG 150–2/2 fibrous glass yarns to form the circumferentials 88 were circumferentially wound around the longitudinal pullers as they were pulled axially along the aforementioned mandrel at a speed of approximately seven inches per minute to form a filament-wound tube. This tube was then passed through a cylindrical grommet wherein a 40% *ethyl alcohol solution* of Narmco #2101 resin (viscosity of 40–60 second efflux time at room temperature in a Zahn #4, cup) was *uniformly spread* over the tube. Narmco #2101 resin is a mixture similar to Narmco #2102 with four parts phenolic resin to one part nylon. A uniform longitudinal layer of Owens-Corning HTS 994–1 20 end rovings (comprising 24 roving strands), which had been passed through a tank containing a 25% ethyl alcohol solution of Narmco #2101 resin (viscosity of 25–35 seconds efflux time at room temperature in a Zahn #2 cup) and heated to the B-stage condition in a dryer oven to 160°–170° F., was then applied to the resin impregnated tube to provide the longitudinal rovings 84. The tube was then passed through a polytetrafluoroethylene guide member and sequentially through three heated dies where the tube was pressed between the heated dies and the mandrel to cure the resin. The dies in the order they faced the tubing, were heated to 360° F., 365° F., and 475° F., respectively.

After the tube passed through the last curing die it passed through a tube straightening die and cooled after which it was cut into eight-foot lengths. The tubes were then visually inspected and found to have a deep yellow color through to the longitudinal pullers, which indicated acceptable penetration of the resin. The yarn adherence was uniform from the rovings to the innermost longitudinal pullers and when viewed from the tube end, the inside longitudinal fibers were attached and reasonably straight. There were no excessive longitudinal cracks or fissures on the outside of the tube. The inside diameter of the tube varied from 0.4995 to 0.5000 inch. The outside diameter of the tube varied between 0.557 to 0.560 inch.

After the tube was cut to size it was placed in a curing oven for 30 minutes at 290–325° F., cooled, and then dipped in a tank containing a 5–10% ethyl alcohol solution of Narmco #2101 resin. After removal of excess resin and drip drying, the tube was placed in an oven and cured for 50 minutes at 290–325° F.

The tube was then coated interiorly with a cellulose acetate solution and with the vertical coating apparatus and method taught in my aforementioned copending application Ser. No. 374,928. The cellulose acetate solution, comprising 778 grams cellulose acetate, 1868 grams acetone, 77 grams magnesium perchlorate, 105 grams sodium chloride, and 350 grams distilled water, was ball milled, debubbled in a 57° C. water bath and then filtered warm. The membrane solution was applied at a temperature of −5° C. to the tube through an annular orifice at a pressure of 12 p.s.i., and the thickness of the film or membrane controlled by the use of a circular doctor blade as shown and described in said application Ser. No. 374,928. The membrane coated tube was moved downwardly at a rate of two inches per minute through an air dry zone where the tube was subjected to 475 cc. of air per minute at a temperature of about 10° C. for about 3 minutes after which the tube was subjected to 500 cc. per minute of 3° C. water and the water and air subsequently removed by an exhaust vacuum measured at four inches of mercury. After exhausting, the tube was heated in an 82° C. water bath for 3 minutes.

Utilizing the test apparatus shown in FIGURE 13 sea water at a pressure of 1,000 p.s.i. was circulated through six-foot long tube 130, made as described in this example, at a flow rate of approximately 500 cc./minute and potable water recovered in a pan 132 longitudinally disposed under the tube. The sea water was circulated by means of pump 136 from tank 138 through line 134, thence through the tube 130 and returned to tank 138 through line 140. Pressure regulator 142 was used in line 140 to control back pressure. The water pressure in the tube was determined with gage 142. The salinity of the water was reduced from approximately 35,000 p.p.m. to 2,500 p.p.m. and the water recovery rate was approximately six gallons/sq. ft. membrane per day. The recovery was possible due to the porosity of the tube. As indicated previously, porosity may be due to both a lower resin content and blowing agents. In this example porosity resulted from the resin content and the vaporization of volatile components in the resin mixture.

Example II

Brackish water containing 5,000 p.p.m. was desalinated to 225 p.p.m. salinity using a membrane coated tube made in accordance with the procedure of Example I. The membrane solution was the same as that used in Example I; however, the membrane solution pressure was 50 p.s.i., the tube coating speed 12 inches per minute, the air flow 625 cc. per minute, the cold water rate 750 cc. per minute, and the exhaust vacuum measured at 10–12 inches of mercury. The tube was heated for 30 minutes in a 72° C. water bath after exhausting. The brackish water was passed through a tube in the apparatus of FIGURE 13 at a pressure of 600 p.s.i. and flow rate of approximately 500 cc./minute. The water recovery rate was 11 gallons/sq. ft. membrane/day.

Example III

A tube was made in accordance with the procedure of Example I except that the outer longitudinals (rovings) and circumferential layers were impregnated with Narmco #2025 resin (an amine catalyzed epoxyphenolic resin). The tube was coated with the membrane solution of Example I at a solution pressure of 50 p.s.i. The tube was coated at a rate of six inches per minute with an air flow rate of 325 cc. per minute, a cold water flow rate of 675 cc. per minute, and a vacuum measuring 10'–12" mercury. Nine gallons/sq. ft. membrane/day of 300 p.p.m. water were produced at 600 p.s.i. from 5,000 p.p.m. brackish water using a flow rate of 500 cc./minute.

Example IV

Using the apparatus of FIGURE 13, a beet sugar molasses was concentrated four-fold, by circulation at 1,000 p.s.i. through a membrane coated porous tube similar to those used in Example I except that the membrane was finally heated at 25° C. rather than 72° C. Samples of the feed, concentrate and flux (portion passing through membrane) were analyzed and the following analytical results obtained:

| Fraction | Percent solids | Chloride, mg./ml. | Percent sucrose by polarization |
|---|---|---|---|
| Feed | 13.2 | 6.2 | 4.1 |
| Concentrate | 25.8 | 6.9 | 15.7 |
| Flux | 3.2 | 8.9 | 0.4 |

Thus it can be seen from the foregoing, that my tubular solvent separation apparatus can be utilized to effect separation of solvents and/or solutes from various solutions, with a variety of porous tubes and apparatus utilizing such tubes.

Example V

This example illustrates the use of various blowing agents to produce porosity in a resin impregnated glass fiber tube. Glass fiber tubes were made according to the methods previously described. One group of tubes was made with 258 yarns in the longitudinal layer and 21 yarns per circumferential layer. Another group of tubes was made using 24 rovings in the longitudinal layer and 7 rovings per circumferential layer. In the tube using rovings, a porous layer of filter paper was placed between the glass fiber tube and the membrane. The tubes made from yarns were impregnated with a resin having the following composition:

60% Epocryl E-11, a liquid thermosetting resin containing bisphenol A and acrylate made by the Shell Chemical Company.
40% orthochlorostyrene
3.5 p.p.h. U. S. Peroxygen peroxide catalyst #245
.04 p.p.h. dimethylanaline The resin used with the tubes formed from rovings was:

55% Epocryl E-11
45% orthochlorostyrene
3.5 p.p.h. U. S. Peroxygen peroxide catalyst #245
.04 p.p.h. dimethylanaline Tubes made by this method were tested for porosity by connecting a one foot long speciment of tubing (approximately ⅛ square foot) to a short head of water approximately two feet, and measuring the amount of water passed by the tube in 15 minutes. A desirable porosity of 20 gallons per day per square foot is equivalent to 120 ml. of water in 15 minutes. The porosity thus determined, designated control porosity, was approximately 20 ml. for the tubes with yarns and 90 ml. for the tubes with rovings.

The improvement in porosity obtainable with blowing agents was illustrated by adding a small amount of either toluene, hexane, benzene or ethanol as a blowing agent to the resin composition. Tubes formed with a blowing agent containing resin were also tested for porosity and the results indicated in the following table.

| Average resin percent | No. of tubes | Blowing agent | Porosity (ml./15 min.) | Control porosity [1] | Resin |
|---|---|---|---|---|---|
| 16.7 | 15 | Toluene (10 p.p.h.) plus 1 p.p.h. CAB-O-SIL.[2] | 150 | 20 | Standard for yarns. |
| 16.6 | 8 | 10 p.p.h. hexane plus 1 p.p.h. CAB-O-SIL. | 100 | 20 | Do. |
| 15.8 | 15 | Benzene (10 p.p.h.) plus 1 p.p.h. CAB-O-SIL. | 90 | 20 | Do. |
| 18.4 | 1 | H₂O (1 p.p.h.) plus 1 p.p.h. ethylene. | 105 | 20 | Do. |
| 14.1 | 7 | 3 p.p.h. EXRE | 380 | 90 | Standard for rovings with paper. |

[1] Control porosity is the porosity of a series using the standard resin system and no blowing agent.
[2] The CAB-O-SIL is added as a thickening agent and had no measured effect on porosity.

It can be seen that even with a resin percentage as low as 14.1%, the greatest porosity obtained without a blowing agent was 90 ml. which is below the desired 120 ml. Addition of a blowing agent improved the porosity to many times that obtained without a blowing agent.

Example VI

This example illustrates a method of obtaining high porosity tubes without the use of a blowing agent. A number of tubes were made with a relatively low resin content. The porosity in millilitres and burst strength of the tubes was determined. Although the tubes had a high porosity, they also had a burst strength of approximately 2,000 p.s.i. as compared to burst strength of 3,500–4,500 p.s.i. obtainable with higher resin contents. The results of these tests are summarized below.

| Burst, p.s.i. | Porosity, ml. | Total resin, percent |
|---|---|---|
| 2,750 [1] | 1,850 | 11.8 |
| 2,250 | 3,600 | 11.5 |
| 1,900 | 3,800 | 11.4 |
| 1,850 | 3,600 | 11.1 |
| 2,150 | 3,600 | 10.4 |
| 2,000 | 2,300 | 9.4 |
| 2,000 | 7,200 | 9.0 |

[1] Average values obtained for 36 tubes.

Having fully described my invention, it is to be understood that I do not wish to be limited to the details set forth, but my invention is of the full scope of the appended claims.

I claim:

1. A method for separating materials from a solution by reverse osmosis, comprising the steps of passing said solution under pressure through a porous resin-impregnated fibrous tube provided with a circumferentially continuous inner surface of substantially uniform cross sectional dimensions throughout the length of said tube, said tube further having a semipermeable osmotic membrane supported on the inner surface thereof, said pressure being in excess of the osmotic pressure of said solution, whereby solute is exuded through the walls of said tube, and recovering the separated products.

2. The method of claim 1, wherein the solution is a water solution to be concentrated and the concentrated product is recovered after it passes longitudinally through the tube.

3. The method of claim 1, wherein said membrane is mechanically bonded to said tube.

4. The method of claim 1, wherein the solution is passed through a plurality of said tubes in a two-stage process, wherein exudate recovered from the first stage is passed through tubes comprising the second stage.

5. The method of claim 1, wherein the tube is formed of glass fibers impregnated with a phenolic resin.

6. The method of claim 1, wherein said solution is saline water and an exudate substantially free from salt is recovered.

7. The method of claim 6, wherein the solution is brine and the pressure is at least 350 p.s.i.

8. The method of claim 6, wherein said solution is recirculated through said tube.

9. A tubular structure for use in separating a solvent from a pressurized solvent-solute solution by reverse osmosis, said tubular structure comprising:
a tube formed of a material having a multiplicity of fibers defining an open interstitial structure, said tube including a resin composition impregnating said structure to render it substantially rigid, said tube having a circumferentially continuous inner surface of substantially uniform cross sectional dimensions throughout its length, said tube further including a multiplicity of passages extending through said resin composition and said structure; and
a semipermeable osmotic membrane supported upon the interior surface of said tube, the structural integrity and rigidity of said tube being sufficient to support said membrane under the conditions of reverse osmosis, said passages providing exudation paths for solvent passing through said membrane.

10. A tubular structure as set forth in claim 9 wherein said interstitial structure is defined by a multiplicity of fibers, a substantial portion of which are circumferentially disposed.

11. A tubular structure as set forth in claim 9 wherein the inner diameter of said tube is approximately one-half inch.

12. A tubular structure as set forth in claim 9 wherein said interstitial structure is defined by a multiplicity of glass fibers.

13. A tubular structure as set forth in claim 12 wherein said membrane is bonded to said interior surface.

14. A tubular structure as set forth in claim 12 wherein a layer of highly porous material is interposed between said interior surface and said membrane.

15. A tubular structure as set forth in claim 12 wherein a substantial portion of said glass fibers are circumferentially disposed.

16. A tubular structure as set forth in claim 9 wherein said membrane is cast and supported upon said interior surface as an integral part thereof.

17. A tubular structure as set forth in claim 16 wherein a layer of highly porous material is interposed between said interior surface and said membrane.

18. A tubular structure as set forth in claim 16 wherein a substantial portion of said fibers are circumferentially disposed.

19. A tubular structure as set forth in claim 9 wherein a layer of highly porous material is interposed between said interior surface and said membrane.

20. A tubular structure as set forth in claim 19 wherein said highly porous material is filter paper.

21. In reverse osmosis apparatus for separating a solvent from a solvent-solute solution, the combination of:
a plurality of elongated tubes each comprising a multiplicity of fibers which are reinforced with resin to provide a porous structure having a circumferentially continuous, elongated interior surface of substantially uniform cross sectional dimensions facing said solution;
a semipermeable membrane supported on said interior surface in contact with said solution and operative to pass said solvent at a higher rate than it passes said solute, the span of the pores in each said tube being sufficiently small to support said membrane without rupture of said membrane under reverse osmosis pressures, said span being sufficiently large to permit essentially free, generally radial flow of said solvent through said tube;
fitting means interconnecting the ends of said tubes to effect continual fluid flow through said tubes and fitting means;
means for circulating said solution through said tubes under a pressure in excess of the osmotic pressure of said solution; and
collecting means that receive the solute flowing transversely through said tubes.

22. The apparatus of claim 21 wherein said plurality of tubes are arranged in a first stage and a second stage, and said fitting means pass the solute from said first stage to said second stage.

23. The apparatus of claim 21 wherein said pressure in excess of the osmotic pressure is at least 600 pounds per square inch.

24. A method for separating materials from a solution by reverse osmosis, said method comprising the steps of:
forming an open interstitial tubular structure of a multiplicity of circumferentially continuous fibers impregnated with a resin composition to provide structural integrity;
curing said resin composition including deliberately inducing the formation of pores in the combination of said fibers and said resin composition;
passing said solution under pressure through a semipermeable membrane supported on said structure and thence through said pores; and
recovering the separated products.

References Cited

UNITED STATES PATENTS

| | | | |
|---|---|---|---|
| 1,825,631 | 9/1931 | Horvath | 210—23 |
| 2,133,132 | 5/1964 | Loeb et al. | 210—23 X |
| 3,228,876 | 1/1966 | Mahon | 210—22 |
| 1,949,476 | 3/1934 | Kennedy | 156—294 |
| 2,540,152 | 2/1951 | Weller. | |
| 2,607,494 | 8/1952 | Valente et al. | 210—508 X |
| 2,723,705 | 11/1955 | Collins | 156—179 X |
| 2,799,644 | 7/1957 | Kollsman | 210—321 X |
| 2,864,506 | 12/1958 | Hiskey | 210—321 |
| 2,880,501 | 4/1959 | Metz | 210—321 X |
| 2,926,104 | 2/1960 | Goetz | 210—504 X |
| 2,958,391 | 11/1960 | Rosset | 55—16 |
| 2,987,472 | 6/1961 | Kollsman | 210—321 X |
| 3,060,119 | 10/1962 | Carpenter | 210—22 |
| 3,061,107 | 10/1962 | Taylor | 210—187 |
| 3,156,645 | 11/1964 | Chapin et al. | 210—321 X |
| 3,170,867 | 2/1965 | Loeb et al. | 210—500 X |
| 3,210,229 | 10/1965 | Feine | 156—213 |
| 3,216,876 | 11/1965 | Tyhurst | 156—173 |
| 3,246,764 | 4/1966 | McCormack | 55—158 X |

FOREIGN PATENTS

| | | |
|---|---|---|
| 84,684 | 12/1957 | Denmark. |
| 239,777 | 9/1925 | Great Britain. |

REUBEN FRIEDMAN, Primary Examiner

FRANK A. SPEAR, Jr., Assistant Examiner

U.S. Cl. X.R.

210—321, 490, 500

FO-1050
(5/69)

UNITED STATES PATENT OFFICE
CERTIFICATE OF CORRECTION

Patent No. _____3,457,170_____ Dated_ July 22, 1969

Inventor(s) _____G. G. HAVENS_____

It is certified that error appears in the above-identified patent and that said Letters Patent are hereby corrected as shown below:

Column 1, line 21, delete "solute" and insert --solvent--; Column 6, line 38, delete "librate" and insert --liberate--; Column 11, line 27, delete "solvent" and insert --solution--; Column 11, line 31, delete "solvent" and insert --solution--; Column 11, line 45, delete "againt" and insert --again--; Column 12, line 68, delete "solvent" and insert --solution--; Column 16, line 74, delete "solute" and insert --solvent--; Column 18, line 19, delete "solute" and insert --solvent--; and Column 18, line 23, delete "solute" and insert --solvent--.

SIGNED AND
SEALED
MAY 26 1970

(SEAL)
Attest:

Edward M. Fletcher, Jr.
Attesting Officer

WILLIAM E. SCHUYLER, JR.
Commissioner of Patents